(12) United States Patent
Charles

(10) Patent No.: US 8,414,166 B1
(45) Date of Patent: Apr. 9, 2013

(54) PORTABLE HEADLIGHT FOR WATERCRAFTS

(76) Inventor: Gregory James Charles, Chino, CA (US)

( * ) Notice: Subject to any disclaimer, the term of this patent is extended or adjusted under 35 U.S.C. 154(b) by 120 days.

(21) Appl. No.: 13/116,939

(22) Filed: May 26, 2011

(51) Int. Cl.
*B60Q 1/00* (2006.01)
*F21V 1/00* (2006.01)
*B63B 35/73* (2006.01)
*B63B 45/02* (2006.01)

(52) U.S. Cl.
USPC .............................. 362/477; 362/368; 362/370

(58) Field of Classification Search ................... 362/368, 362/370, 371, 457, 477, 523, 549; 114/343, 114/364, 55.5–55.58
See application file for complete search history.

(56) References Cited

U.S. PATENT DOCUMENTS

| | | | | | |
|---|---|---|---|---|---|
| 3,543,016 | A | * | 11/1970 | Jones | 362/371 |
| 4,164,784 | A | * | 8/1979 | Jaksich | 362/282 |
| 4,423,473 | A | * | 12/1983 | Kirkley | 362/186 |
| 4,638,414 | A | * | 1/1987 | de Vos et al. | 362/370 |
| D300,865 | S | | 4/1989 | Belletire et al. | |
| 5,205,645 | A | * | 4/1993 | Lee | 362/431 |
| 5,469,345 | A | * | 11/1995 | Pettersen et al. | 362/188 |
| 5,488,361 | A | | 1/1996 | Perry | |
| 5,595,441 | A | | 1/1997 | McGee | |
| 5,664,866 | A | | 9/1997 | Reniger et al. | |
| 6,176,601 | B1 | | 1/2001 | Nester | |
| 6,499,867 | B1 | | 12/2002 | Neal | |
| 6,637,915 | B2 | | 10/2003 | Von Wolske | |
| 6,641,288 | B1 | | 11/2003 | Olsen | |
| 8,021,024 | B2 | * | 9/2011 | Huang | 362/294 |
| 2007/0256622 | A1 | | 11/2007 | Charles | |

* cited by examiner

Primary Examiner — John A Ward

(57) ABSTRACT

A lighting system for use with a watercraft comprising a light module wherein a light bulb is mounted on the front end with an on-off switch, with a handle which pivotably attaches to the light module, further comprises a rechargeable battery which is mounted to a cut-away opening in a cowling with a U-bracket.

8 Claims, 5 Drawing Sheets

BACK VIEW

PORTABLE HEADLIGHT FOR WATERCRAFTS

BACKGROUND OF THE INVENTION

The present invention is directed to a lighting system for watercraft. The lighting system of the present invention provides a way for people using a watercraft at night to be able to see.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
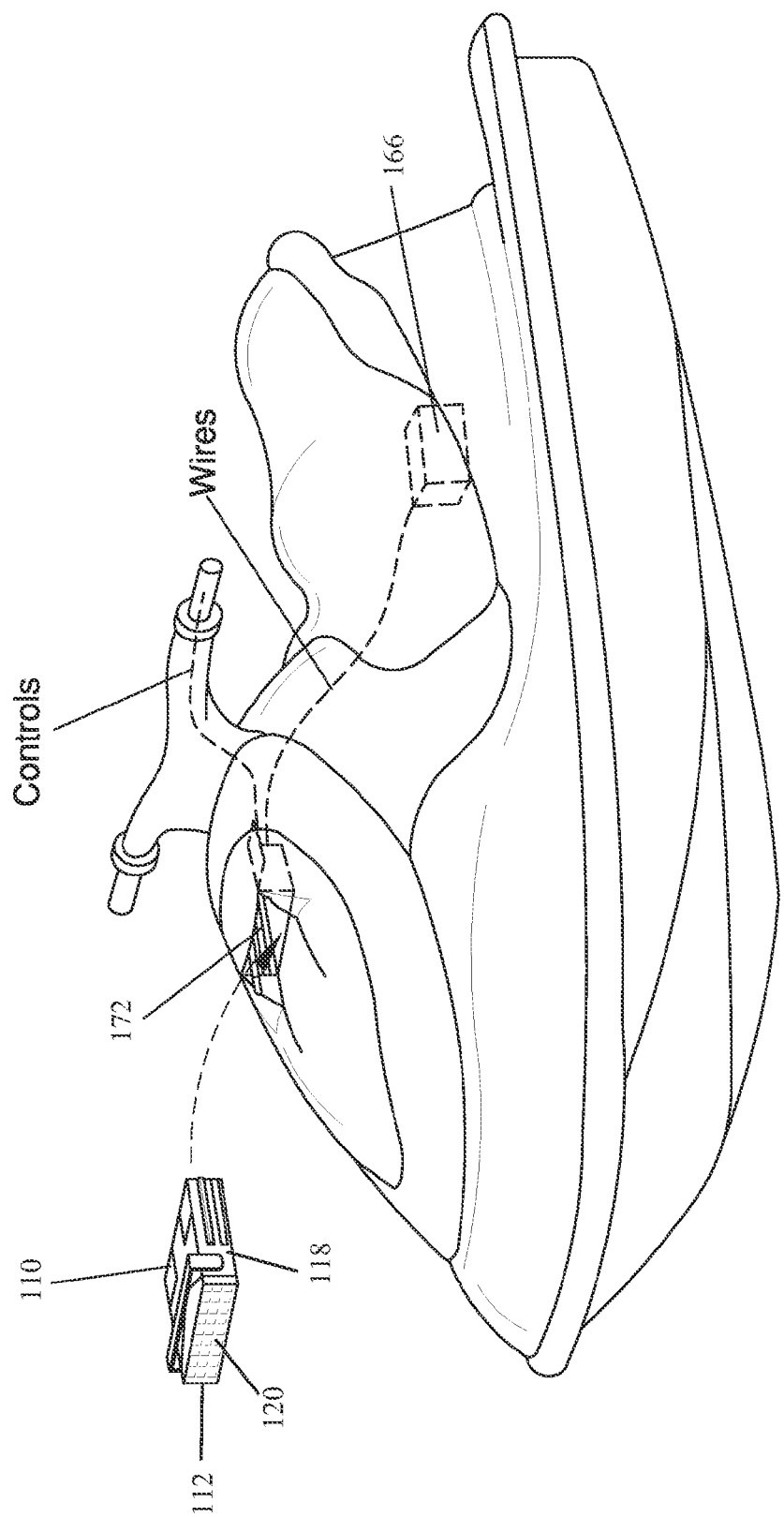
FIG. 1 shows a lighting system in use with a watercraft.
Figure 2:
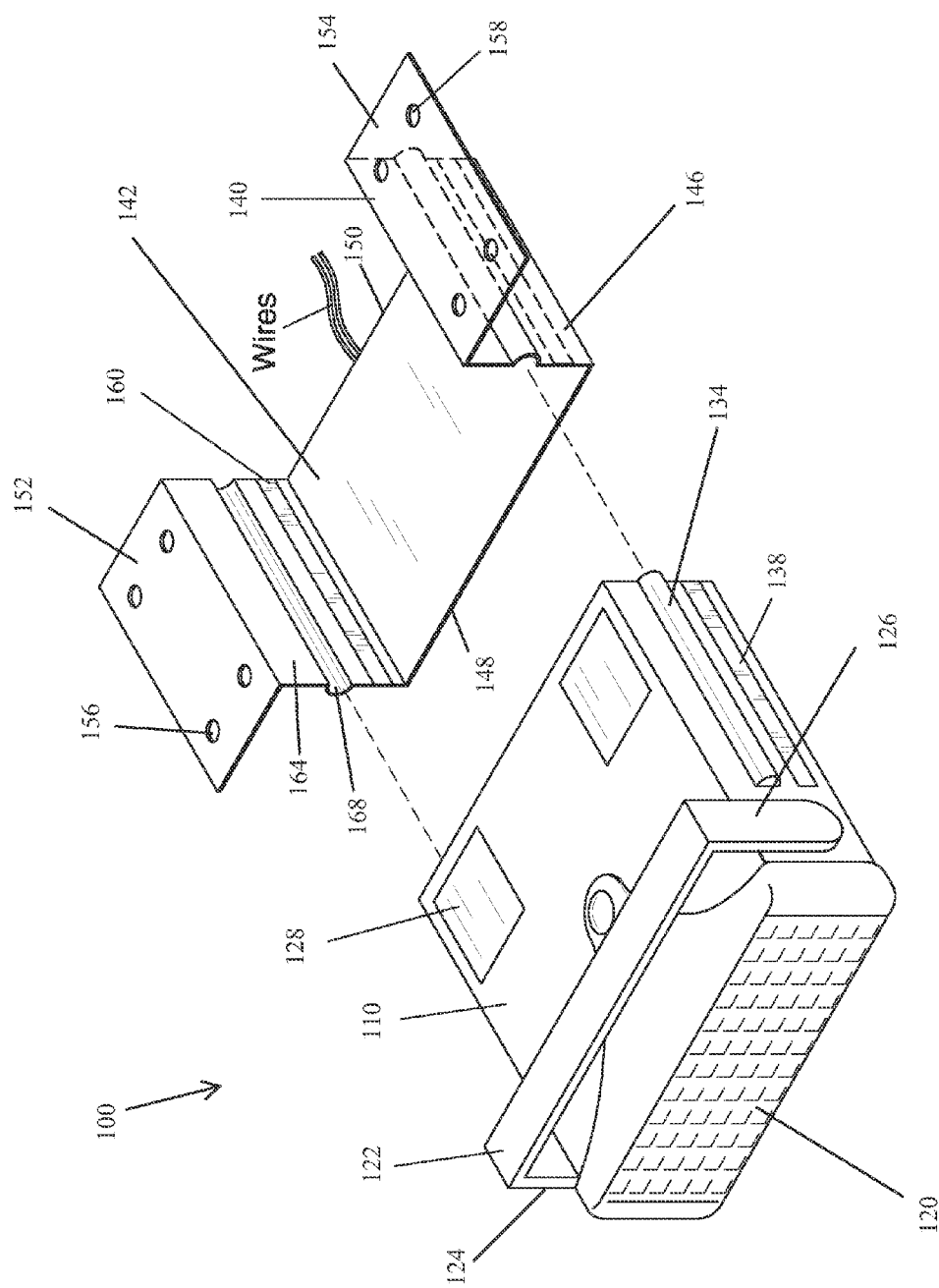
FIG. 2 shows a lighting system with U-bracket.
Figure 3:
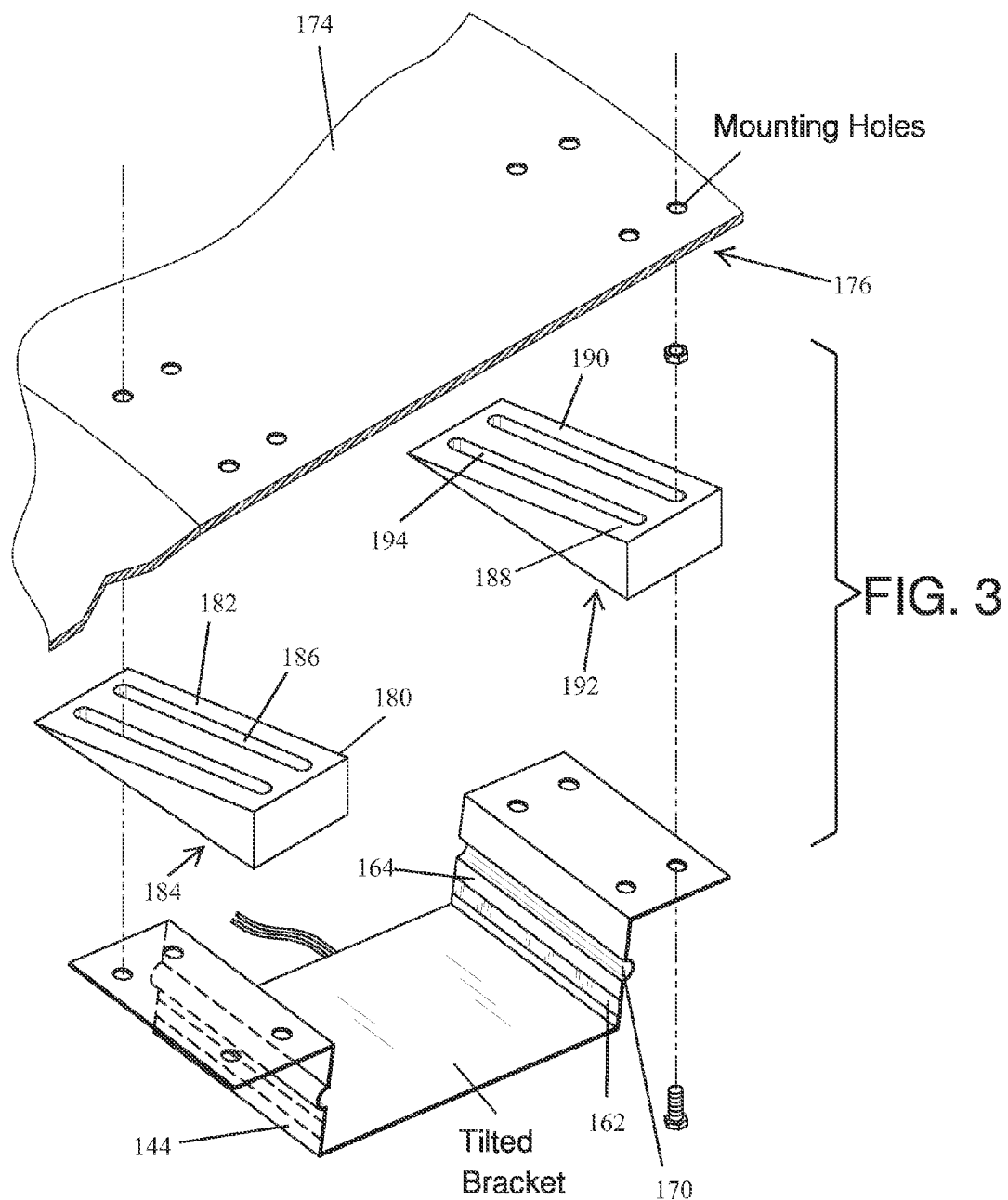
FIG. 3 shows an exploded view of the lighting system.
Figure 4:
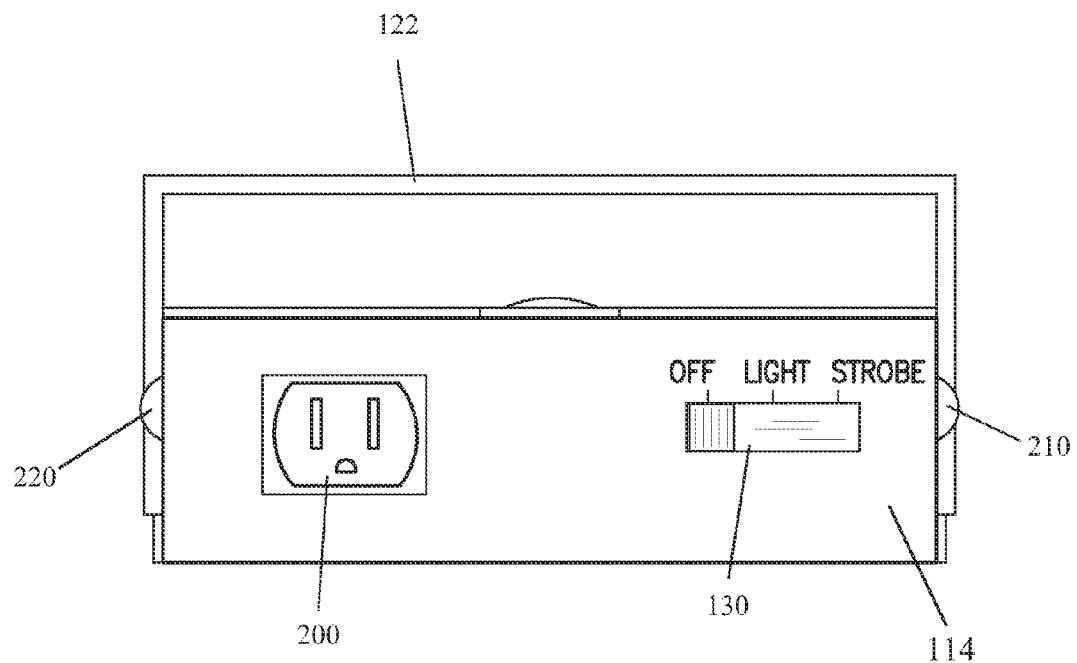
FIG. 4 shows a back view of the lighting system.
Figure 5:
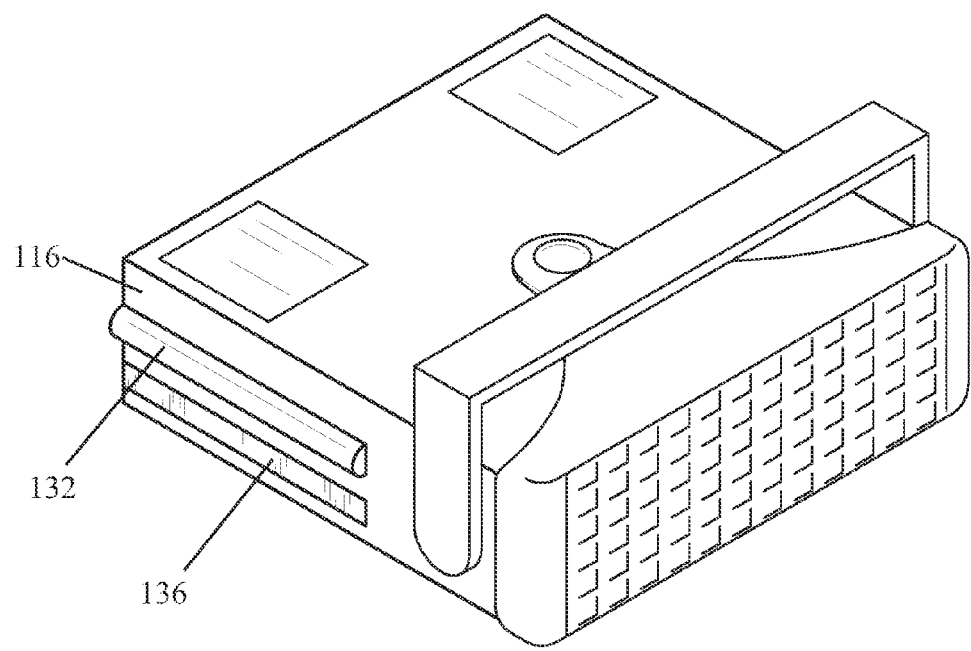
FIG. 5 shows the opposite side of a lighting system without the U-bracket.

Referring now to FIGS. 1-4, the present invention features a lighting system 100 comprising a light module 110 having a front end 112, back end 114, first side 116 and second side 118. The system further comprises a light bulb 120 which is mounted on the front end of the light module.

The system further comprises a handle 122 having a first handle end 124 and a second handle end 126 wherein the first handle end pivotably attaches to the first side of the light module and the second handle end attaches to the second side of the light module.

The system further comprises a rechargeable battery 128 disposed within the light module. The system further comprises an on-off switch 130 disposed on the light module, the on-off switch being operably connected to the rechargeable battery and the light bulb.

The system further comprises a first contour member 132 disposed on the first side which runs from the front end toward the back end of the light module. The system further comprises a second contour member 134 disposed on the second side which runs from the front end toward the back end of the light module.

In some embodiments, the first contour member comprises a first male mounting strip disposed on the first side, the first male mounting strip runs from the front end toward the back end of the light module, wherein the first complementary contour portion comprises a first female slot disposed on the first bracket side wherein the first female slot runs from the front bracket end to the back bracket end.

In some embodiments, the second contour member comprises a second male mounting strip disposed on the second side, the second male mounting strip runs from the front end toward the back end of the light module; and wherein the second complementary contour portion comprises a second female slot disposed on the second bracket side wherein the second female slot runs from the front bracket end to the back bracket end.

The system further comprises a first module contact strip 136 disposed on the first side of the light module, and a second module contact strip 138 disposed on the second side of the light module. The first module contact strip and the second module contact strip are operably connected to the rechargeable battery.

In some embodiments, the first module contact strip is disposed on the first side of the light module and the second module contact strip is disposed on the second side of the light module, wherein the first bracket contact strip is disposed on the first bracket side and the second bracket contact strip disposed on the second bracket side, the first and second bracket strip face each other.

The system further comprises a U-bracket 140 comprising a bracket base 142, a first bracket side 144, a second bracket side 146, a front bracket end 148 and a back bracket end 150. A first top portion 152 of the first bracket side is bent outwardly away from the second bracket side, and a second top portion 154 of the second bracket side is bent outwardly away from the first bracket side. The U-bracket further comprises one or more mounting holes 156 which are disposed on the first top portion of the first bracket side and one or more mounting holes 158 which are disposed on the second top portion of the second bracket side.

The U-bracket further comprises a first bracket contact strip 160 and a second bracket strip 162 disposed on an internal side 164 of the U-bracket. The first bracket contact strip and the second bracket contact strip are operably connected to a water craft battery 166. The U-bracket further comprises a first complementary contour portion 168 disposed on the first bracket side wherein the first complementary contour portion runs from the front bracket end to the back bracket end. The U-bracket further comprises a second complementary contour portion 170 disposed on the second bracket side wherein the second complementary contour portion runs from the front bracket end to the back bracket end. The U-bracket is disposed within a cut-away opening 172 in a cowling 174 where the U-bracket is mounted to an underside of the cowling 176 via the mounting holes that are disposed on the first top portion and second top portion of the bracket sides.

The light module is inserted into the U-bracket. The first and second contour members of the light module snugly slide into the first and second complementary contour portions of the bracket, respectfully, wherein light is secured within the U-bracket. When the first module contact strip touches the first bracket contact strip, and the second module contact strip touches the second bracket contact strip, the water craft battery charges the light module's rechargeable battery.

In some embodiments, the light bulb is a strobe light. In some embodiments an electrical plug receptacle is disposed on the light module. The electrical plug receptacle is operably connected to an alternate-current/direct current (AC/DC) converter, and the AC/DC converter is operably connected to the rechargeable battery.

In some embodiments, the lighting system further comprises a first wedge 180. The first wedge comprising a first top wedge surface 182 and a first bottom wedge surface 184. The first wedge also comprises a slit 186 cutting the first top wedge surface through to the first bottom wedge surface. The first wedge is inserted between the first top portion of the bracket and the cowling, and the inserted first wedge causes the bracket to be mounted at an angle so that the light module secured therein could be adjusted to shine upwardly or downwardly.

In some embodiments, the lighting system further comprises a second wedge 188. The second wedge comprising a second top wedge surface 190 and a second bottom wedge surface 192. The second wedge also comprises a slit cutting 194 the second top wedge surface through to the second bottom wedge surface. The second wedge is inserted between the second top portion of the bracket and the cowling, and the inserted second wedge causes the bracket to be mounted at an angle so that the light module secured therein could be adjusted to shine upwardly or downwardly.

In some embodiments, the docked light module can be turned on or off by an external control that is conveniently located, for example, on a steering handle bar of the craft. For example, in some embodiments, the light module further comprises an electronic on/off switch disposed within the light module. The electronic on/off switch is operably disposed in between the connection between the battery (power source) that powers the light bulb and the light bulb. The electronic on/off switch is operably connected to an external control which can activate the electronic on/off switch to turn on or off. For example, when the external control activates the electronic on/off switch to turn off the light bulb does not receive power from the battery and the light bulb is turned off. Vice versa, when the external control activates the electronic on/off switch to turn on the light bulb receives power from the battery and the light bulb is turned on. All components (e.g., the external control, etc.) mentioned herein would appropriately be operably connected to a power source in accordance with standard common electronics knowledge.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A lighting system comprising:
    (a) a light module having a front end, back end, first side and second side, wherein a light bulb is mounted on the front end of the light module, a handle having a first handle end and a second handle end wherein the first handle end pivotably attaches to the first side of the light module and the second handle end attaches to the second side of the light module;
    (b) a rechargeable battery disposed within the light module;
    (c) an on-off switch disposed on the light module, the on-off switch being operably connected to the rechargeable battery and the light bulb;
    (d) a first contour member disposed on the first side, the first contour member runs from the front end toward the back end of the light module; a second contour member disposed on the second side, the second contour member runs from the front end toward the back end of the light module;
    (e) a first module contact strip disposed on the first side of the light module, and a second module contact strip disposed on the second side of the light module, the first module contact strip and the second module contact strip are operably connected to the rechargeable battery;
    (f) a U-bracket comprising a bracket base, a first bracket side, a second bracket side, a front bracket end and a back bracket end, wherein a first top portion of the first bracket side is bent outwardly away from the second bracket side, and a second top portion of the second bracket side is bent outwardly away from the first bracket side, one or more mounting holes are disposed on the first top portion of the first bracket side and one or more mounting holes are disposed on the second top portion of the second bracket side;
    (g) a first bracket contact strip and a second bracket strip disposed on an internal side of the U-bracket, the first bracket contact strip and the second bracket contact strip are operably connected to a water craft battery;
    (h) a first complementary contour portion disposed on the first bracket side wherein the first complementary contour portion runs from the front bracket end to the back bracket end, a second complementary contour portion disposed on the second bracket side wherein the second complementary contour portion runs from the front bracket end to the back bracket end;
    wherein the U-bracket is disposed within a cut-away opening in a cowling where the U-bracket is mounted to an underside of the cowling via the mounting holes that are disposed on the first top portion and second top portion of the bracket sides;
    wherein the light module is inserted into the U-bracket, the first and second contour member of the light module snugly slide into the first and second complementary contour portion of the bracket, respectfully, wherein light is secured within the U-bracket, wherein the first module contact strip touches the first bracket contact strip, and the second module contact strip touches the second bracket contact strip for the water craft battery to charge the light module's rechargeable battery.

2. The lighting system of claim 1 wherein the first module contact strip is disposed on the first side of the light module and the second module contact strip is disposed on the second side of the light module, wherein the first bracket contact strip is disposed on the first bracket side and the second bracket contact strip disposed on the second bracket side, the first and second bracket strip face each other.

3. The lighting system of claim 1 wherein the first contour member comprises a first male mounting strip disposed on the first side, the first male mounting strip runs from the front end toward the back end of the light module; the second contour member comprises a second male mounting strip disposed on the second side, the second male mounting strip runs from the front end toward the back end of the light module; and wherein the first complementary contour portion comprises a first female slot disposed on the first bracket side wherein the first female slot runs from the front bracket end to the back bracket end, the second complementary contour portion comprises a second female slot disposed on the second bracket side wherein the second female slot runs from the front bracket end to the back bracket end.

4. The lighting system of claim 1 wherein the light bulb is a strobe light.

5. The lighting system of claim 1 wherein an electrical plug receptacle is disposed on the light module, the electrical plug receptacle is operably connected to an alternate-current/direct current (AC/DC) converter, and the AC/DC converter is operably connected to the rechargeable battery.

6. The lighting system of claim 1 further comprising a first wedge, the first wedge comprising a first top wedge surface and a first bottom wedge surface, the first wedge also comprises a slit cutting the first top wedge surface through to the first bottom wedge surface, wherein the first wedge is inserted between the first top portion of the bracket and the cowling, and the inserted first wedge causes the bracket to be mounted at an angle so that the light module secured therein could be adjusted to shine upwardly or downwardly.

7. The lighting system of claim 1 further comprising a second wedge, the second wedge comprising a second top wedge surface and a second bottom wedge surface, the second wedge also comprises a slit cutting the second top wedge surface through to the second bottom wedge surface, wherein the second wedge is inserted between the second top portion of the bracket and the cowling, and the inserted second wedge causes the bracket to be mounted at an angle so that the light module secured therein could be adjusted to shine upwardly or downwardly.

8. A lighting system comprising:
   (a) a cowling with a cut-away opening;
   (b) a light module having a front end, back end, first side and second side, wherein a light bulb is mounted on the front end of the light module; a handle having a first handle end and a second handle end wherein the first handle end pivotably attaches to the first side of the light module and the second handle end attaches to the second side of the light module;
   (c) a rechargeable battery disposed within the light module;
   (d) an on-off switch disposed on the light module, the on-off switch being operably connected to the rechargeable battery and the light bulb;
   (e) a first contour member disposed on the first side, the first contour member runs from the front end toward the back end of the light module; a second contour member disposed on the second side, the second contour member runs from the front end toward the back end of the light module;
   (f) a first module contact strip disposed on the first side of the light module, and a second module contact strip disposed on the second side of the light module, the first module contact strip and the second module contact strip are operably connected to the rechargeable battery;
   (g) a U-bracket comprising a bracket base, a first bracket side, a second bracket side, a front bracket end and a back bracket end, wherein a first top portion of the first bracket side is bent outwardly away from the second bracket side, and the second top portion of the second bracket side is bent outwardly away from the first bracket side, one or more mounting holes are disposed on the first top portion of the first bracket side and one or more mounting holes are disposed on the second top portion of the second bracket side;
   (h) a first bracket contact strip and a second bracket strip disposed on an internal side of the U-bracket, the first bracket contact strip and the second bracket contact strip are operably connected to a water craft battery;
   (i) a first complementary contour portion disposed on the first bracket side wherein the first complementary contour portion runs from the front bracket end to the back bracket end, a second complementary contour portion disposed on the second bracket side wherein the second complementary contour portion runs from the front bracket end to the back bracket end;
   wherein the U-bracket is disposed within the cut-away opening of the cowling where the U-bracket is mounted to an underside of the cowling via the mounting holes that are disposed on the first top portion and second top portion of the bracket sides;
   wherein the light module is inserted into the U-bracket, the first and second contour member of the light module snugly slide into the first and second complementary contour portion of the bracket, respectfully, wherein light is secured within the U-bracket, wherein the first module contact strip touches the first bracket contact strip, and the second module contact strip touches the second bracket contact strip for the water craft battery to charge the light module's rechargeable battery.

* * * * *